United States Patent [19]

Bruner et al.

[11] 3,713,149
[45] Jan. 23, 1973

[54] COOPERATIVE RADAR SYSTEM

[75] Inventors: Weston G. Bruner, Adelphi; Johnnie L. Pearson, Severna Park; George C. Reeder, Jr., Pasadena; Alfred F. Gaheen, Jr., Glen Burnie, all of Md.; Elberson D. Green, Santa Ana, Calif.; Robert B. Hughes, College Park, Md.

[73] Assignee: Westinghouse Electric Corporation, Pittsburgh, Pa.

[22] Filed: Sept. 5, 1969

[21] Appl. No.: 855,621

Related U.S. Application Data

[63] Continuation-in-part of Ser. No. 665,550, Sept. 5, 1967, abandoned.

[52] U.S. Cl. ..................... 343/7 A, 343/7.3, 343/7.5, 343/9
[51] Int. Cl. ................................................. G01s 9/14
[58] Field of Search .......... 343/6.5 R, 7 A, 7.3, 7.5, 9

[56] References Cited

UNITED STATES PATENTS

| | | | |
|---|---|---|---|
| 3,226,713 | 12/1965 | Sorkin et al. | 343/6.5 |
| 3,305,861 | 2/1967 | Bunce | 343/7.5 UX |

*Primary Examiner*—T. H. Tubbesing
*Attorney*—F. H. Henson, E. P. Klipfel and J. L. Wiegreffe

[57] ABSTRACT

A PRF ranging doppler radar system comprising a frequency-phase locked interrogator and a transponder radar wherein lock up occurs in a CW mode while range is determined in a pulse mode by tracking the pulse repetition frequency (PRF) in respective servo loops which match the pulse width and travel time distance between the radars. Identical range track loops exist in the interrogator and transponder and range error is derived by comparing the center of the received pulse with the center of a pair of split range gates. When the range error is nulled, both radars transmit with the same PRF which is a function of the range separation between the two.

12 Claims, 10 Drawing Figures

COOPERATIVE RADAR SYSTEM

CROSS-REFERENCE TO RELATED APPLICATION

This application is a continuation-in-part of our application, Ser. No. 665,550, filed Sept. 5, 1967, now abandoned.

BACKGROUND OF THE INVENTION

This invention relates to pulse radar systems of the cooperative type wherein at least two radar systems operate in combination with one another wherein one of the radar systems, commonly referred to as the interrogator radar, transmits a signal to a second radar system, commonly referred to as a transponder, whereupon the transponder transmits a signal back to the interrogator. Moreover, the present invention relates to a system wherein the pulse repetition rate is variable as a function of the distance between units.

Known prior art apparatus which is related to this concept is U.S. Pat. No. 3,095,564, issued to Victor F. Cartright. This patent discloses a range measuring system wherein the transmitter is modulated by means which generates short pulses at a controlled repetition rate. This pulse information is returned by the transponder to provide a pulse signal in which the pulses are delayed by an amount determined in part by the distance between the two stations. The generated pulse signal and the return signal are both applied to a phase sensitive device, the output of which is passed through a low pass filter, amplified and used to control the pulse repetition rate of the pulse generating means. The pulse repetition rate is automatically adjusted to balance the system so that the return pulses bear a predetermined phase or time relationship to the transmitted pulses. The pulse repetition rate at which balance occurs is a function of the distance between stations.

Also the concept of phase lock loops in radar systems is treated in a publication entitled "Phase-Lock Loop Frequency Acquisition Study" by J. P. Frazier and J. Page in the "IRE Transactions on Space Electronics and Telemetry," Sept., 1962.

SUMMARY OF THE INVENTION

The subject invention discloses an improved cooperative rendezvous radar system comprising an interrogator and transponder radar operable first in a CW mode for acquisition and then in a pulsed mode for ranging wherein range is determined by tracking the respective PRF which is servoed to the separation between the interrogator and transponder. Means are included wherein the interrogator transmits at a first or fixed RF carrier frequency. The transponder receives the first carrier frequency and develops an IF which is used in a phase lock loop to control the frequency of a swept variable frequency oscillator (VFO). When frequency coincidence occurs between the IF and the VFO, phase lock obtains and sweeping of the VFO stops whereupon the transponder replies by sending a signal back to the interrogator at a second RF carrier frequency generated from the now substantially fixed frequency VFO, with the frequency difference or offset between the first and second RF frequencies being substantially equal to the IF frequency of both radars. The interrogator which also includes a swept VFO phase locks to its IF signal in response to the second RF frequency transmitted from the transponder. The two radars thus phase lock together through their IF which is developed from the received signal of the other radar. When lock up occurs in the CW mode the pulse mode at the same carrier frequency is initiated. The centers of the received pulses are respectively compared nearly simultaneously with the centers of split range gates to provide error voltages which are used to control a range track loop in each radar which changes the repetition rate of a respective variable PRF oscillator and the pulse width of the corresponding transmitted pulse in a direction to reduce the errors in the transponders and the interrogator simultaneously.

The range track circuit means included in each radar are responsive to the respective IF pulse signal which in turn is applied to the input of a phase comparator. A phase keyer circuit controlled by the split range gates is also coupled to the phase comparator and a reference frequency from the now fixed frequency VFO is applied to the phase keyer such that the reference frequency has its phase inverted at a rate controlled by a variable frequency multivibrator which acts as the PRF oscillator. The variable frequency multivibrator is operative such that when the IF pulse and the reference frequency are in phase a positive DC voltage is obtained from the phase comparator. When the two signals are out of phase, a DC voltage of equal amplitude but of negative polarity is obtained. The phase comparator output is applied to an integrator circuit which is coupled to the variable frequency multivibrator for controlling the PRF frequency. If the DC output from the phase comparator is comprised of pulses of unequal duration, as they will be when the centers of the received IF pulse and the range gates do not coincide, the control voltage from the integrator circuit will change causing the output PRF and the corresponding transmitted pulse width to change accordingly. The resulting error between the centers of the range gates and the received pulses will be changed until an equilibrium condition is obtained. The PRF at said equilibrium position will be the same at both radars and will be a function of the range separation between them.

DESCRIPTION OF THE PREFERRED EMBODIMENT

Figure 1:
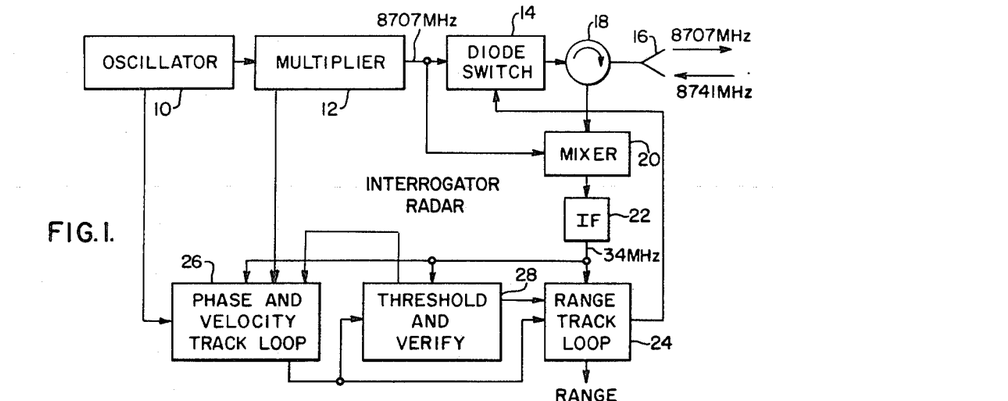
FIG. 1 is a skeletal block diagram of the interrogator radar comprising the subject invention.

Referring now to FIG. 1, there is illustrated a simplified block diagram of the interrogator radar which is operable both in a CW and pulse mode of operation and which shall be hereinafter referred to as the "interrogator." A master oscillator 10 which has a frequency, for example, of approximately 17 megahertz (MHz) is coupled to a frequency multiplier circuit 12 which may be for example a solid state varactor multiplier for providing a first carrier frequency output of 8707 MHz. The 8707 MHz output from the multiplier 12 comprises a CW RF signal which is coupled to a normally closed diode switch 14 in the CW mode but which is operable in response to a switching signal applied thereto in the pulsed mode to provide an RF radar pulse output of a predetermined pulse repetition frequency (PRF) in response to the switching signal. The radar CW or pulse output from the diode switch 14 is coupled to a radar antenna 16 by means of a transmit-receive device 18 which comprises for example a circulator. The T/R device 18 is coupled to a microwave mixer 20 which also receives an input (8707 MHz) from the output of the frequency multiplier 12. The output of the mixer 20 is coupled to an IF amplifier 22 having a predetermined frequency response including 34 MHz. The IF output signal from the IF amplifier 22 is coupled into a range track loop 24, a phase and velocity track loop 26 and a threshold and verifying circuit 28. The phase and velocity track loop 26 contains a variable frequency oscillator, not shown, the output of which comprises a reference frequency which is phase locked to the IF signal in the velocity track loop and is additionally fed to the threshold and verify circuit 28 and the range track loop 24. The range track loop 24 in addition to providing range information contains a variable frequency multivibrator, not shown, which acts as a variable PRF generator, the output of which controls a transmit gate circuit, not shown, which in turn controls the diode switch 14 providing the predetermined PRF to operate said switch.

Figure 2:
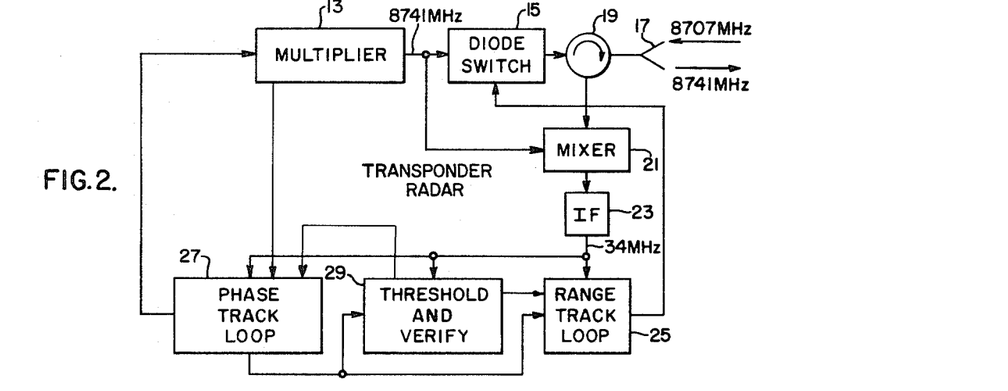
FIG. 2 is a skeletal block diagram of the transponder radar comprising the subject invention.

FIG. 2 is illustrative of a simplified block diagram of the transponder radar also operable both in a CW and pulse mode of operation and hereinafter referred to simply as the "transponder." The transponder is similar to the interrogator with the exception that the transponder does not contain a master oscillator 10 such as shown in FIG. 1, but takes the received radar signal (8707 MHz) from the interrogator, phase locks a sweeping VFO to the IF signal produced therefrom, stopping the sweep and reradiates a second RF carrier frequency (8741 MHz) produced from the output of the phase locked VFO back to the interrogator.

More specifically, the transponder contains an antenna 17 which is coupled to a T/R device 19, the output of which is coupled to a mixer 21. The output of the mixer is fed to an IF amplifier 23. The response of the IF amplifier is also in the range of 34 MHz. The received RF radar signal from the interrogator which is either CW or a series of pulses of said first carrier frequency of 8707 MHz is fed to the mixer 21 and heterodyned by the second carrier frequency from the output of the multiplier 13 down to an IF frequency of 34 MHz. The output of the IF amplifier 23 is fed to a range track loop 25 which is identical to the range track loop 24 in the interrogator and also to a phase track loop 27 and a threshold and verifying circuit 29 which are also identical to that included in the interrogator. The phase track loop 27 is responsive to the transponder 34 MHz IF signal and contains a VFO which phase locks to the 34 MHz IF and is coupled back to the frequency multiplier 13 for generating a second or 8741 MHz carrier frequency. The output of the frequency multiplier 13 is coupled into a normally closed diode switch 15 in the CW mode but which is pulsed on and off in the pulsed mode. The output of the diode switch 14 is coupled to the T/R box 19. The range track loop 24 contains a variable frequency multivibrator, not shown, which acts as a PRF generator and controls a transmit gate circuit which is coupled to the diode switch 14 to produce an RF pulse output from the diode switch 14 in the pulsed mode. The variable frequency oscillator output is doubled in frequency in the phase track loop 27 and comprises a reference frequency which is fed back to the range track loop 24 and the threshold and verifier circuit 29 similar to the interrogator.

The interrogator then radiates first a CW and then after acquisition a pulsed carrier signal of 8707 MHz to which the transponder is responsive. The transponder in turn phase locks to a 34 MHz IF signal produced from the 8707 MHz and radiates a 8741 MHz signal back to the interrogator. A frequency offset of 34 MHz is thus established, the result being that the transmitted frequency, appearing at the output of the respective frequency multipliers 12 and 13 which are coupled to the respective mixers 20 and 21, act as the normally required local oscillator from which the respective IF frequency in the interrogator and transponder is derived. The transponder phase tracks the interrogator RF carrier frequency through its own IF signal and vice versa. Signal coherency by means of the IF signal is thus maintained from the interrogator to the transponder and back to the interrogator since the received signal (8741 MHz) from the interrogator is heterodyned to a 34 MHz IF signal by the 8707 MHz carrier signal and is phase tracked in the velocity track loop 26.

Figure 3:
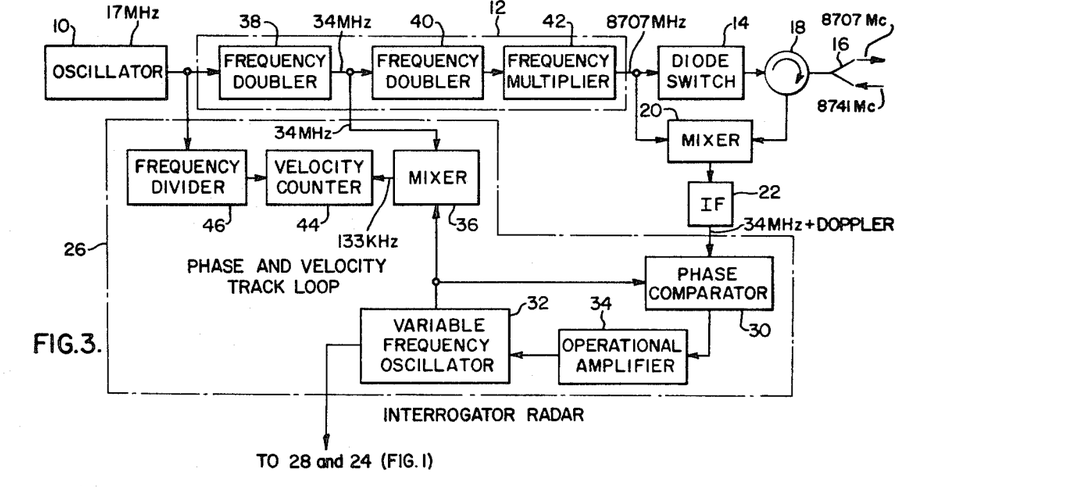
FIG. 3 is a simplified block diagram further illustrative of the phase and velocity track loop included in the interrogator radar shown in FIG. 1.

The interrogator phase and velocity track loop 26 of FIG. 1, inter alia, is shown in greater detail in FIG. 3. Although a complete explanation will be supplied subsequently, its purpose is to phase lock the VFO 32 to the IF signal and measure velocity. It is comprised of a phase comparator circuit 30 which is coupled to the output of the IF amplifier 22. Also a variable frequency oscillator 32, adapted to be swept over a predetermined range of frequencies including 34 MHz, is included which has its output also fed to the phase comparator circuit 30, the output of which will be zero when frequency and phase coincidence occurs. The output of the phase comparator circuit is fed back to the variable frequency oscillator 32 through the operational amplifier 34, for controlling its frequency, thus providing a closed loop which phase locks the variable frequency oscillator 32 to the 34 MHz IF frequency.

The output of the variable frequency oscillator 32 is also applied to a second mixer 36 which has another input coupled thereto from the frequency multiplier circuit 12 which is comprised of a first frequency doubler (X2) circuit 38, a second frequency doubler (X2) circuit 40 and a frequency multiplier (X128) circuit 42, all being coupled in series between the master oscillator 10 and the diode switch 14, so that the output frequency of oscillator 10 is converted to X-band range 8707 MHz at the output of the frequency multiplier 42. The second mixer 36 receives an input from the output of the doubler circuit 38 which is a frequency of 34 MHz. The output of the mixer 36 is fed into a velocity counter 44. An input is also applied to the velocity counter 44 from a frequency divider circuit 46 which is coupled to the 17 MHz output of the master oscillator 10.

In the CW mode of operation which is utilized for acquisition and lock up the return signal from the transponder which first locks up to the interrogator is approximately 8741 MHz. It is mixed with the fixed interrogator transmit frequency of 8707 MHz resulting in an IF frequency of approximately 34 MHz plus the doppler frequency, assuming relative movement between the radars which is a function of velocity. The resulting IF frequency is applied to the phase and velocity track loop 26 and by way of the phase comparator 30, the operational amplifier 34 and variable frequency oscillator 32 is mixed down to a second IF frequency indicative of the doppler frequency in the mixer 36 and fed into the velocity counter 44 where the doppler frequency is counted. The period of the counter 44 is determined by taking a portion of the 17 MHz output from the master oscillator 10 and dividing it by a factor of 17 × 10⁶ providing a count time of 1 second. As a result, any change in the frequency of the master oscillator during the RF transmit time will not cause an error in the doppler measurement which is indicative of velocity because the count period will change to compensate for any error.

Figure 4:
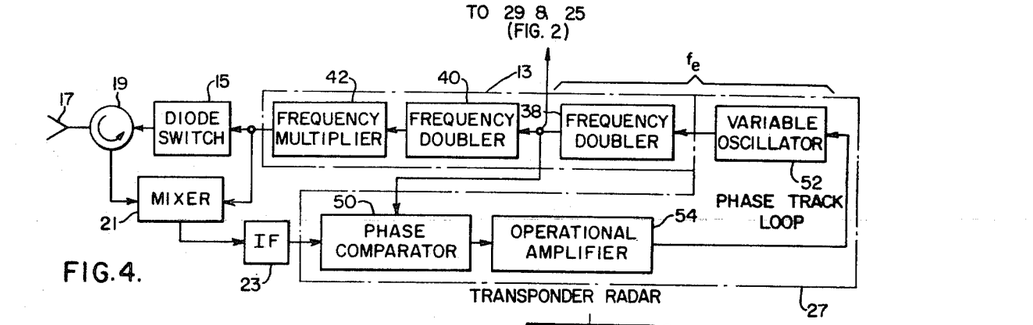
FIG. 4 is a simplified block diagram further illustrative of the phase track loop included in the transponder radar.

The phase track loop 27 of FIG. 2, inter alia, is shown in greater detail in FIG. 4. Its purpose is to phase lock the output of a variable frequency reference oscillator to the transponder IF signal produced from the RF received from the interrogator. It is comprised of a phase comparator circuit 50 coupled to the IF amplifier 23 and the frequency multiplier circuit 13 which is shown comprised of the pair of frequency doubler circuits 38 and 40 and a (X128) multiplier circuit 42. The multiplier circuit 13 is coupled between the diode switch 15 and a variable frequency oscillator 52 which comprises a portion of the phase track loop 27. Coupled between the phase comparator circuit 50 and the variable frequency oscillator 52 is an operational amplifier 54 which is used to control the frequency of the oscillator 52.

In operation, the phase track loop 27 of the transponder when locked up to the interrogator produces a 34 MHz IF signal from the mixer 21 and forces a frequency output from the variable frequency oscillator 52 and doubler 38 of 34 MHz such that when it is multiplied by the frequency doubler 40 and the frequency multiplier 42 the transponder radiates back to the interrogator from the antenna 17 a frequency of 8741 MHz. A frequency offset of 34 MHz is maintained because a frequency of 8707 is received from the interrogator. The frequency offset is established as follows:

Let
 $f_t$ = transponder transmit frequency, (8741 MHz)
 $f_s$ = transponder receive frequency, (8707 MHz)
 $f_{IF}$ = transponder IF frequency, and
 $f_e$ = (X2) the VFO 52 frequency or the reference frequency in the phase lock loop 27.

Mixing the frequencies $f_t$ and $f_s$ results in the following equation:

$$f_t - f_s = f_{IF}$$

However,
 the phase track loop 27 makes $f_e = f_{IF} \approx 34$ MHz
Therefore, $$f_t - f_s = f_e$$

But $$f_e \times 256 = f_t$$

And $$f_e = f_t/256$$

Substituting $f_t - f_s = f_t/256$
Or $$f_t(1 - 1/256) = f_s$$

Therefore, $$f_t = 256/255 \, f_s.$$

Thus the transponder transmit frequency $f_t$ bears a fixed relationship to the received frequency $f_s$ from the interrogator. With $f_s$ equal to 8707 MHz and the difference frequency between $f_s$ and $f_t$ being approximately 34 megacycles, the transponder transmit frequency must be approximately equal to 8741 MHz.

The range between the interrogator and transponder is determined in a pulse mode of operation after CW acquisition and lock up wherein the variable frequency oscillators 32 and 52 of the interrogator and transponders are phase locked to their respective IF signals and are generating or used to generate a substantially fixed reference frequency output of 34 MHz which is also equal to the IF frequency. The diode switches 14 and 15 are operated in accordance with a gate signal coupled from a transmit gate driven by a variable PRF multivibrator and range tracking is accomplished when the pulses of the PRF transmitted from the interrogator and transponder respectively are phase locked with the PRF received. A constant duty cycle however is maintained such that the ratio between the transmitted pulse width and the pulse repetition period is fixed.

The range tracking function concerns the ability of the range track loops 24 and 25 in the interrogator and transponder to phase lock to the IF pulses received and match the width of their respective transmitted pulse to the received pulse width. Since the phase of the received signal is related to its space travel time, the system has a continuously variable pulse repetition frequency depending upon the range separation between the radars. In order to maintain equal pulse widths when the interrogator and transponder move with respect to one another, it is necessary that the transmitted pulse widths be made identical not only to each other but also to the transmission time delay associated with the range between them. Thus, as the interrogator and transponder move towards one another, their transmitted pulse width is made to decrease by increasing the PRF. They are accordingly both equal to the range time delay. Then, as this relationship is maintained, a measurement of the interrogator pulse width or PRF provides a measure of the range between the radars.

Figure 5:
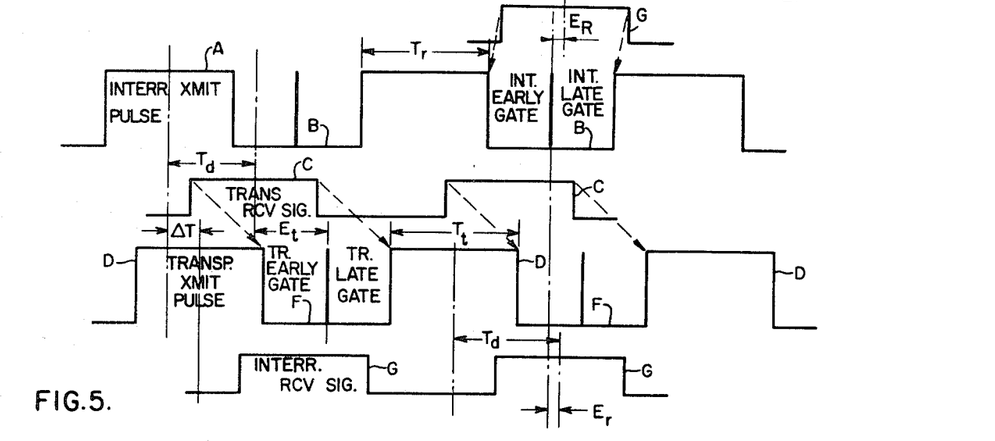
FIG. 5 is an illustration of time related waveforms helpful in understanding the operation of the subject invention.

FIG. 5 is a waveform diagram illustrative of the time relationship between a transponder and interrogator ideally operating on a 50 percent duty cycle. In the subject invention a shorter duty cycle is utilized as will be shown subsequently. Waveform A is illustrative of the transmitted radar pulse from the interrogator and reference character B is indicative of the interrogator early and late range gates. Waveform C is illustrative of the interrogator radar pulse which arrives at the transponder after a propagation time $T_d$, the time necessary for the radar pulse to travel in space from the interrogator to the transponder. Waveform D is illustrative of the radar pulse transmitted from the transponder while reference character F is indicative of the transponder early and late range gates. Waveform G is indicative of the transponder transmitted pulse which arrives at the interrogator. It is also delayed by the propagation time $T_d$. For any particular time interval, the interrogator and transponder transmitted pulses A and D are nearly coincident in time although a small error in time $\Delta T$ may exist. The interrogator and transponder pulses have respective pulse widths $T_r$ and $T_t$, respectively, for a particular time interval. As noted, both transmitted pulses require a propagation time $T_d$ to travel through space between the units. The centers of both pulses are compared nearly simultaneously with the centers of the transponder and interrogator range gates F and B, respectively, and error voltages are derived which are proportional to the time delays $E_t$ and $E_r$ where the time $E_t$ is equal to the time difference between the center of the transponder range gate F and the interrogator pulse C received at the transponder and the time delay $E_r$ is equal to the time difference between the center of the transponder pulse G received at the interrogator and the interrogator range gates B. The error voltages denoting the time $E_t$ and $E_r$ are used in the transponder and interrogator, respectively, to control loops that change the frequency of the respective variable PRF generators, which synchronously control the position and width of not only the range gates but also the transmitted RF pulses. For example, the corresponding transmitted pulse widths are changed accordingly by means of a transmit gate circuit driven from a variable multivibrator in the interrogator and transponder, in a direction to reduce the timing errors $E_t$ and $E_r$ in the transponder and interrogator simultaneously. When the timing errors $E_t$ and $E_r$ are reduced to zero, the pulse widths $T_t$ and $T_r$ will be equal as desired.

Figure 6:
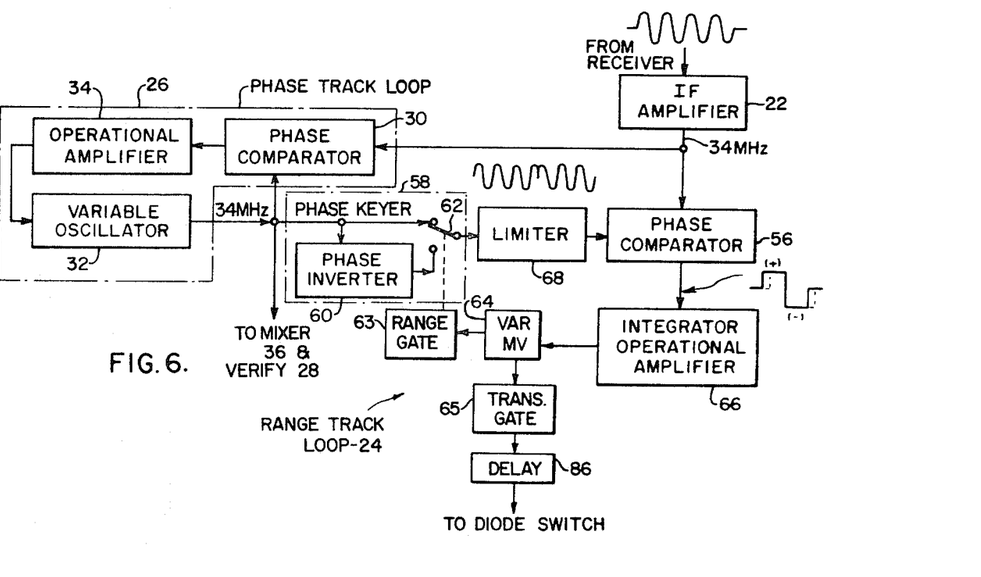
FIG. 6 is a simplified block diagram further illustrative of the range track loop included in both the interrogator radar.
Figure 9:
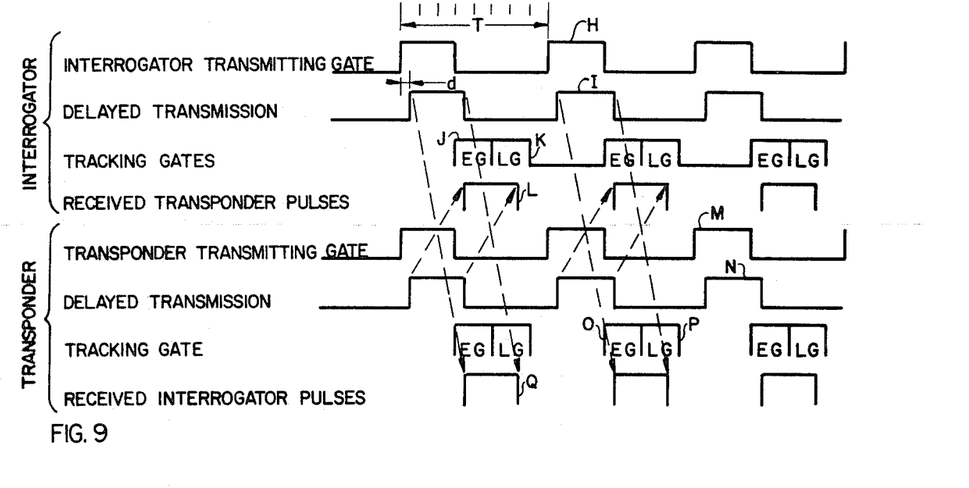
FIG. 9 is a diagram of waveforms helpful in understanding the operation of the present invention.
Figure 10:
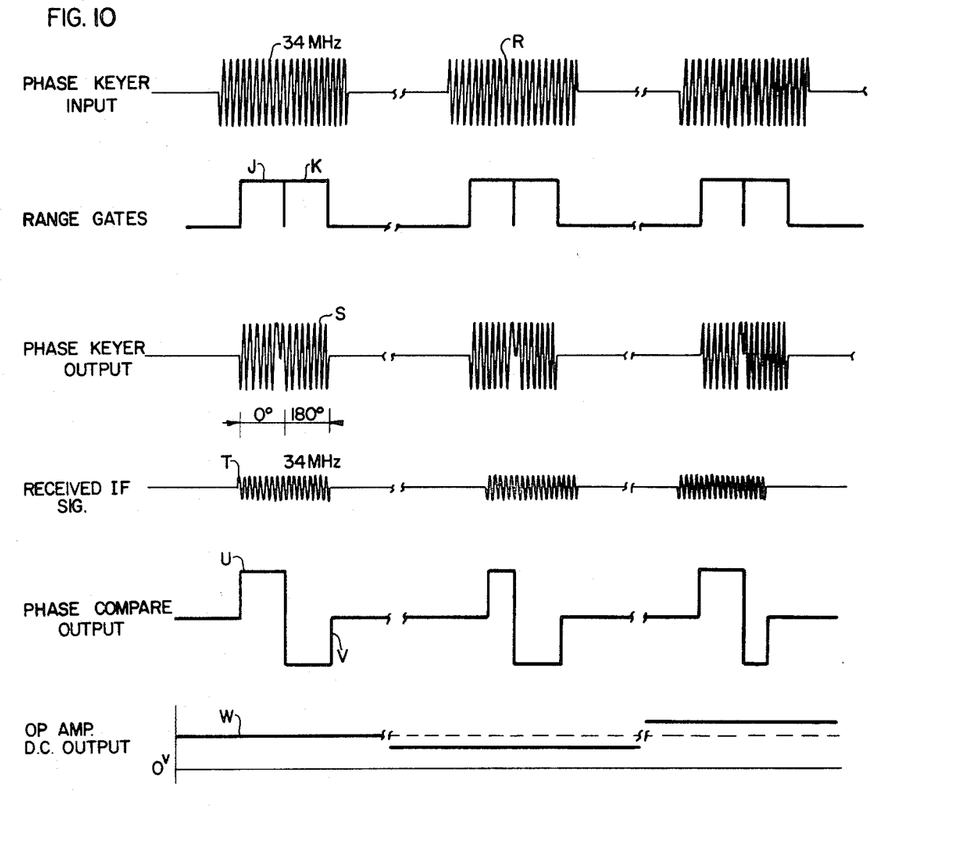
FIG. 10 is another diagram of waveforms helpful in understanding the operation of the present invention.

Referring now more particularly to the subject invention, attention is directed to FIGS. 6, 9 and 10. Reference to FIG. 6 illustrates a block diagrammatic representation of one embodiment of the range track circuitry 24 utilized in the interrogator, making note of the fact that the identical circuitry is included in the transponder. Reference numeral 26 is indicative of the phase track portion of the phase and velocity track loop illustrated in FIG. 1. Additionally, a second phase comparator circuit 56 is coupled to the output of the IF amplifier 22. A reference frequency which is 34 MHz when lock-up is present is coupled from the variable frequency oscillator 32 in the phase track circuitry to a phase keyer circuit 58. The phase keyer 58 comprises a phase inverter 60 and an electrically operated switch 62. The switch 62 is controlled by a range gate generator 63 driven by a voltage variable multivibrator 64 which is coupled to an integrator operational amplifier 66. The operational amplifier 66 is fed an input from the output of the phase comparator 56. The electrically operated switch 62 moreover is connected to a limiter circuit 68 which applies its output to the phase comparator 56.

The operation can be explained considering the waveforms depicted in FIGS. 9 and 10. The multivibrator oscillator 64 is operated in response to a voltage from the operational amplifier 66 at eight times the PRF from which a transmit gate circuit 65 generates a three-eighths or 37.5 percent duty cycle transmit gate H over the period T which is applied to the diode switch 14 as waveform I via the fixed delay circuit 86 and a coincidence gate, not shown. Additionally early and late range tracking gates J and K are synchronously generated after the transmit gate H by means of the range gate circuit 63 coupled to the variable multivibrator 64. In like manner, the transponder generates corresponding waveforms M through P and the two radars operate to center the transponder received pulses L over the range gates J and K in the interrogator while the transponder centers its range gates O and P over the received pulses Q from the interrogator.

The delayed transmission by the time $d$ is for the purpose of ranging down to zero. It can be shown by reference to FIG. 9 with the delay $d$ in relation to the period $T$ that:

$$7/16T = d + R/C, \text{ or}$$

$$f = 7/16(d + R/C)$$

where: $d$ = a constant delay
 $R$ = range
 $7/16T$ = time between the center of the transmit gate H and the center of the range gates J and K
 $C$ = speed of light
 $f = PRF = 1/T$ It can be seen that as range closes toward zero the PRF would approach infinity except for the limiting value of $d$, a built-in fixed time delay. The subject radars contemplate ranging between zero and 500 nautical miles.

At long range, the PRF typically is:

$$f = (7)/16 \, (R/C) = (7 \times 10^9)/16 \times 500 \cong \times 6000) \cong 145 \text{ cps}$$

where $C \cong 10^9$ ft/sec

At zero range with $d = 1.5$ usec for example $$f = 7/(16d) = (7 \times 10^6)/(16 \times 1.5) = 290,000 \text{ cps}$$

This delay, $d$, is placed symmetrically in both the interrogator and the transponder.

The centering of the range gates over the received pulses is integrally tied up with the continuously changing PRF and resulting RF pulse width as range changes. Referring now to FIG. 10, the 34 MHz reference frequency R from the variable frequency oscillator 32 is applied to the phase keyer circuit 58 where its phase is alternately inverted and non-inverted as shown by waveform S and applied to the input of the limiter circuit 68 in accordance with the range gates generated by the range gate circuit 63 alternating the switch means 62. When the 34 MHz IF signal pulses T and the reference frequency R from the VFO 32 are in phase a positive DC voltage U is obtained from the phase comparator 56. When the two signals are 180° out of phase, a DC voltage V of equal amplitude but of negative polarity is obtained. If the center of the received IF pulse T coincides with the center of the detecting gates J and K controlling the switch 62, positive and negative DC pulses U and V of equal width are produced as an output by the phase comparator 56. The signals U and V when applied to the integrator operational amplifier 66 converts the sum of the areas into a control voltage W which is applied to the multivibrator 64 to vary its frequency. When the positive and negative DC pulses U and V are of equal width, the resulting voltage output from the operational amplifier 66 remains fixed at a predetermined level and there is consequently no change in the control voltage applied to the multivibrator 64. However, if the positive and negative DC pulses are of unequal duration, as they will be when the centers of the received and detecting gates do not coincide, giving rise to the timing errors $E_t$ and $E_r$ (FIG. 5), the multivibrator 64 control voltage will increase or decrease in the proper direction to achieve a zero error. This will cause the PRF to change, effecting a corresponding change of the transmitted radar pulse output inasmuch as the multivibrator 64 controls the operation of the transmit gate circuit 65. The error between the centers of the detection gates and the received pulses will change until an equilibrium position is obtained. This operation will occur simultaneously in both the interrogator and the transponder until the timing errors $E_r$ and $E_t$ are reduced to zero.

In this manner the VFO signal from 32 is compared in phase to the same signal to which it locked. It is gated by the early and late range tracking gates in the phase keyer 58 which inverts the phase of the signal at the time interface of the two gates. Inasmuch as the signals are phase locked, this results in the bipolar output of the phase comparator 56. The average value of the output is proportional to any misalignment between the juncture of the early-late gates and the center of the received IF pulse.

In addition to the phase track and range track loops described, both the interrogator and transponder respectively contain a threshold and verifier circuit 28 and 29 which is utilized in the CW acquisition mode of operation wherein the interrogator and transponder sense one another and begin the lock-up function. Upon acquisition the circuit 28 switches operation to the pulse mode.

Figure 7:
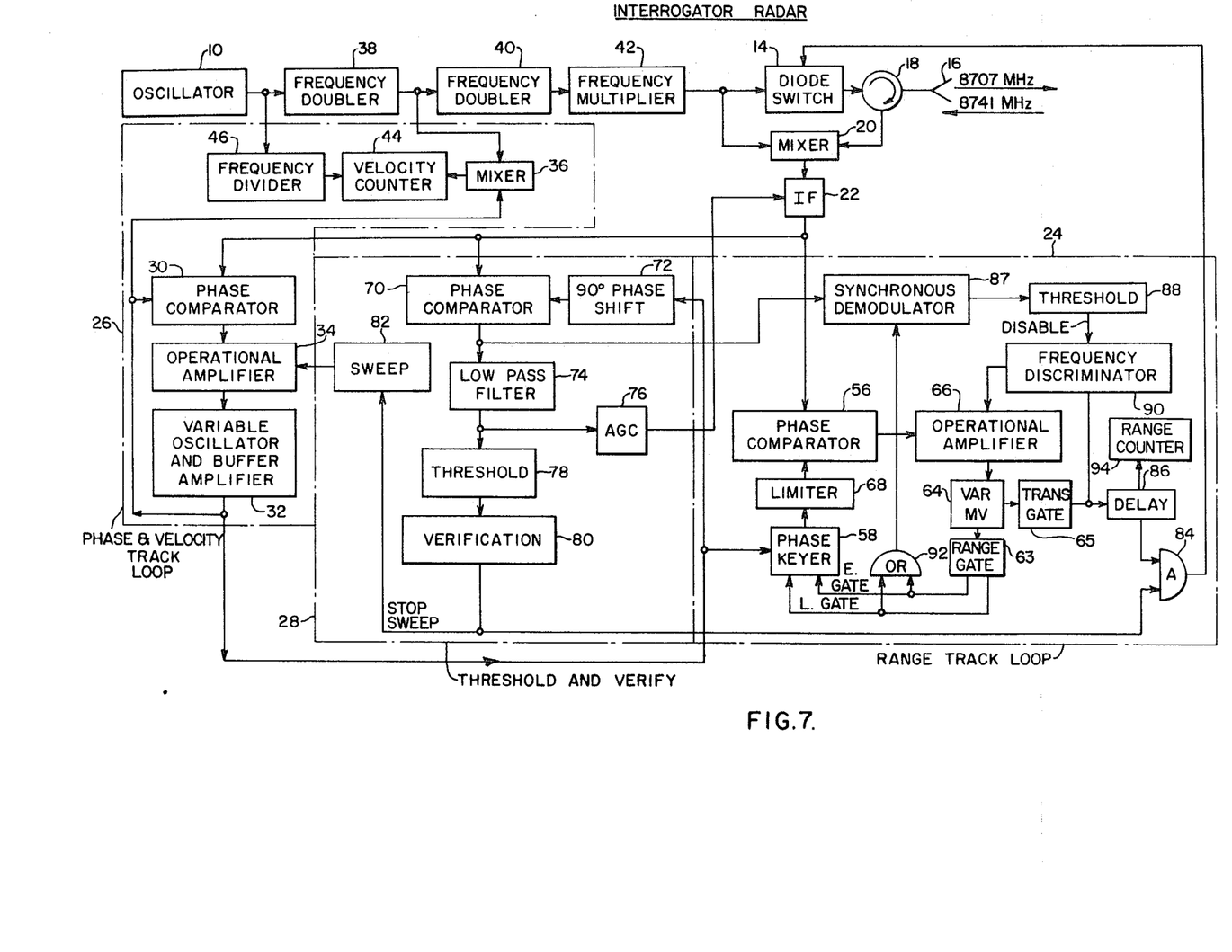
FIG. 7 is a detailed block diagram of the interrogator radar shown in FIG. 1.
Figure 8:
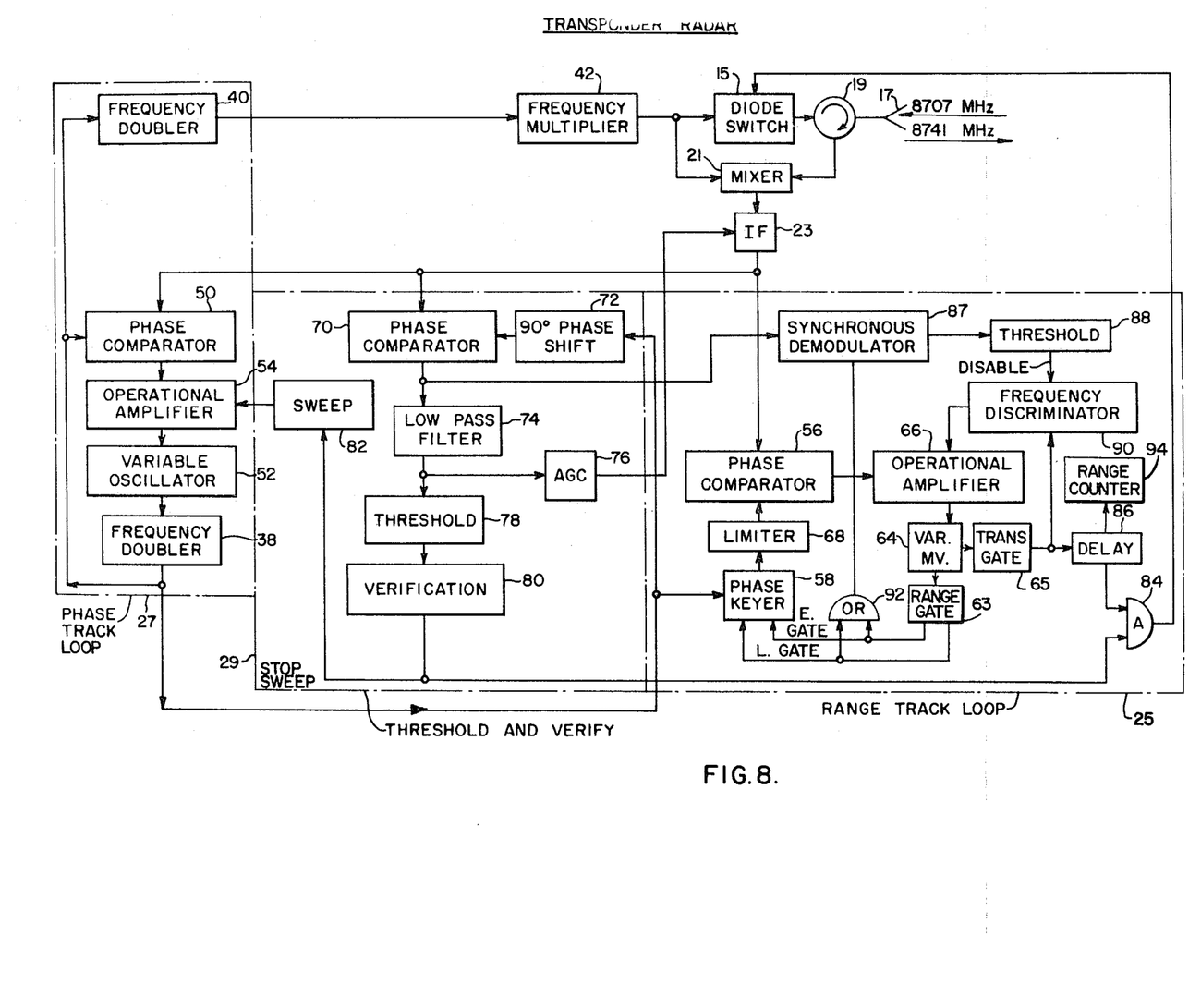
FIG. 8 is a detailed block diagram of the transponder radar shown in FIG. 2.

FIGS. 7 and 8 respectively disclose an overall block diagram of the interrogator and transponder including the threshold and verifying circuit 28 and 29. Each threshold and verifier circuit comprises a third phase comparator circuit 60 coupled to its respective IF amplifier and includes an input from a 90° phase shift circuit 72 which is coupled to the reference frequency output from the respective phase track circuit 26 and 27. The phase shift circuit provides a quadrature input to the phase comparator 70 so that a maximum output is developed therefrom when phase and frequency coincidence between the IF and reference frequency occurs. The output of the phase comparator 70 is coupled to a low pass network 74 which is then applied to an AGC circuit 76 used for controlling the gain of the IF amplifier and to a threshold circuit 78. The output of the threshold circuit 78 is coupled to a verification circuit 80, the output of which is coupled to a sweep circuit 82 and an AND gate 84 coupled in the range track loop 24 between the diode switch 14 and a time delay circuit 86. When phase coincidence occurs during acquisition, the threshold circuits 28 and 29 will be triggered to stop the sweeping of the VFO 32 and 52, respectively, and pulsing of the RF will commence due to an enabling gate applied to the coincidence gate 84.

The range track loop 24 additionally contains a synchronous demodulator 87, a second threshold circuit 88 and a frequency discriminator 90, all coupled in series with the output of the phase comparator 70 being coupled to the input of the synchronous demodulator 87. The synchronous demodulator 87 also receives an input from an OR gate 92 which is coupled to the range gate from variable frequency multivibrator 64.

Considering now the overall operation of the interrogator-transponder radar combination, acquisition occurs in series, with velocity lock-up occuring first in a CW mode and then range lock-up being accomplished in a pulse mode. In greater detail a CW signal at a frequency of 8707 MHz is transmitted by the interrogator. The variable frequency oscillator 52 in the transponder, meanwhile, is being swept by means of the sweep circuit 82 so that the frequency output of oscillator 52 and the output of the frequency multiplier 42 is sweeping over a predetermined range. Upon reception of the 8707 MHz signal at the input of the mixer 21 at the transponder, the resultant IF signal applied to the IF amplifier 23 approaches 34 MHz and falls within the bandpass of the phase track loop 27 during a sweep of the oscillator 52 which will momentarily generate a 17 MHz signal. The amplitude of the IF signal increases thereby and a maximum signal at frequency coincidence appears out of the phase comparator 70 in the threshold and verifier circuit 29 whereupon the threshold level of the threshold circuit 78 is exceeded at which time an output is fed from the threshold circuit 78 to the verification circuit 80 which sends a "-stop sweep" signal to the sweep circuit 82, whereupon sweeping of the VFO 52 stops and the phase loop 27 pulls in and the oscillator 52 provides a reference frequency output which when multiplied by two in the frequency doubler 38 substantially equals 34 MHz. The transponder then replies with a frequency that is 34 MHz greater than the interrogator frequency by means of the output of oscillator 52, the frequency doubles 38 and and 40 and the frequency multiplier 42. This is passed through the diode switch 15 and radiated from the transponder antenna 17.

The variable frequency oscillator 32 in the phase and velocity track loop 24 of the interrogator meanwhile is likewish being swept until a 8741 MHz frequency signal from the transponder, translated to a 34 MHz IF signal at the mixer 20 and amplified in the IF amplifier 22 falls within the bandpass of its phase track loop 26. The threshold 78 in the interrogator threshold and verifier circuit 28 is exceeded, at which time sweeping of the VFO 32 stops and tracking of the Doppler frequency begins. The output of the variable frequency oscillator 32 being applied to the phase keyer circuit 58 is the reference frequency for the phase comparator 56 in the range track loop 24. Lock-up therefore must first be accomplished in the phase track loop 27 in the transponder and then in the phase and velocity track loop 26 in order to obtain a predetermined reference frequency from the variable oscillator 32. The CW mode is used to insure Doppler tracking on the central spectral line and not on a PRF line or side lobe in the spectrum of a pulse signal.

As noted above, a frequency discriminator circuit 90 is included in the range track circuitry 24 for both the interrogator and the transponder. Its purpose is to initially set the pulse repetition frequency (PRF) as generated by the variable frequency multivibrator 64 to the PRF matched to maximum range. While CW lock-up is occurring in the phase track loops 26 and 27, both the interrogator and transponder will be generating range gates at this PRF which are applied to the phase keyer 58. However, no radar pulses of RF are being transmitted due to the lack of an enable signal applied to the AND gate 84 from the verification circuit 80. Once CW lock-up has occurred at the interrogator and the verification signal effecting the stopping of the sweeping of the variable frequency oscillator 32 is present, the AND gate 84 is rendered operative and the interrogator pulse modulates the RF signal at the output of the multiplier circuit 42 by means of the diode switch 14. The transponder receives the pulse modulated signal and compares the phase of the received PRF with the phase of the transponder PRF in the synchronous demodulator 87. When the two signals are in phase, a predetermined threshold in the threshold circuit 88 is exceeded which couples a disable signal to the frequency discriminator circuit 90 which then allows the output of the transmit gate 65 to be coupled through the time delay circuit 86 and the AND gate 84 to the diode switch 14. The diode switch 14 then turns on and off to modulate the RF carrier frequency at the PRF rate. The delay circuit 86 is present to allow ranging down to zero, thereby preventing the PRF from becoming extremely high. When the transponder pulses are received by the interrogator, a similar comparison is made with the respective synchronous demodulator 87 in order to render the frequency discriminator 90 inoperative. Both the interrogator and transponder thus are locked up in frequency and phase and transmit pulses at the same PRF. Both range track loops 24 will change the PRF so as to null any misalignment between the received pulses and the range gates. As a result, the PRF of both the interrogator and transponder will be identical in phase matched to range and providing an indication thereof at both radars, but more particularly by the range counter 94 coupled to the delay circuit 86.

If a verification is lost momentarily, reacquisition is undertaken beginning with the search in the CW mode. Range reacquisition is undertaken with the PRF set to that matched to the maximum range. The PRF is then again swept until the range error signal is of the correct polarity at which time the range loop will automatically pull in as previously described.

In summation, the two radars first transmit in a CW mode, as opposed to a pulsed mode, during acquisition. The radars phase lock to the same IF frequency which is substantially 34 megacycles and which is derived from the transmitted and received frequencies of both radars. The system includes but one master oscillator in the interrogator radar which is used to generate a fixed or first carrier frequency of substantially 8707 MHz of CW power. The transponder radar receives this 8707 MHz signal at the mixer 21 which is also generating a swept RF signal due to the variable oscillator 52 being controlled by the sweep circuit 82. The variable oscillator 52 output, when multiplied by the frequency doublers 38 and 40 as well as the frequency multiplier 42, provides a second carrier frequency which may sweep, for sake of illustration, between the range of 8730 and 8750 MHz. During the sweeping of the variable oscillator 52, there will occur a time during the sweep when frequency coincidence occurs between the respective inputs of the phase comparator 50 and the phase comparator 70, which is the IF output of the IF strip 23 and the output of the frequency doubler 38. At coincidence, a zero output will be provided from the phase comparator 50 due to the 90° phase shift circuit 72 in combination with the phase comparator 70, a maximum output will occur. The system is designed so that when a 34 MHz coincidence appears at the phase comparator 70, a signal sufficient to exceed the threshold value of the threshold circuit 78 will appear which stops the sweep circuit 82. Since the output of the phase comparator 50 at that time is zero, the operational amplifiers 54 will maintain the variable oscillator 52 at that frequency. When the IF frequency is substantially 34 megacycles, the variable oscillator 52 will be generating substantially a 17 MHz signal causing the output of the frequency doubler 38 to be approximately 34 MHz. The output of the frequency multiplier 42 then will be 8741 MHz. The phase comparator 50 then will produce an output to maintain a phase lock between the IF frequency and the variable oscillator 52. When this condition exists, the transponder will be transmitting 8741 MHz of CW power back to the interrogator which goes through the same process. When the interrogator receives a 8741 MHz signal, it mixes with its 8707 MHz signal from its frequency multiplier 42 to provide a 34 MHz IF signal which causes the phase comparator 70 to exceed the threshold 78, causing the variable oscillator 32 to stop and phase lock to the IF by means of the phase comparator 30.

Thus, the acquisition and lock up of the interrogator and transponder radars occur in a CW mode by a phase lock of the IF frequency to the variable frequency oscillators 32 and 52 in the interrogator and transponder radars, respectively; however, the IF frequency is a function of the two carrier frequencies.

Once acquisition is achieved in the phase track loops 26 and 27 and the VFO contained therein is locked to a 34 megacycle IF frequency, the AND gates 84 are activated by the verification circuit 80 in both radars so that the diode switch 14 is turned on and off in a 37.5 percent duty cycle by means of the variable multivibrator 64, and the transmit gate circuit 65, causing the radars to now operate in a pulse mode of operation. The variable frequency oscillators 32 and 52 now supply substantially a fixed frequency reference signal which is applied to the phase keyer 58 and the multivibrator 64 causes one-half of this signal to be applied to the phase comparator 56 during one-half period of the multivibrator 64 in a non-inverted phase and for the other one-half of the period in an inverted phase generating what is commonly referred to as "split range gates." IF pulses from the IF 22 are also applied to the phase comparator 56. If the IF pulse is centered between the non-inverted and the inverted output of the phase keyer 58, the phase comparator will provide a positive and a negative polarity output of equal duration at which time the operational amplifier 66 will integrate this signal. Since the positive and negative portions are of equal duration, no change of the multivibrator 64 frequency will occur. However, if the IF pulse is not centered between the non-inverted and inverted portions of the phase keyer 58, the operational amplifier 66 will generate a larger or smaller signal in a proper direction to change the frequency of the multivibrator to effect centering of the IF pulse. This has a secondary effect in that it causes a change in the PRF of the respective radars due to the coupling of the variable multivibrator 64 back to the diode switch 14. The variable multivibrator 64 then will operate to center the IF pulse between the range gates provided by the phase keyer 58. As relative movement occurs between the two radars, however, the centering of the received IF pulses at the phase comparator 56 with respect to the phase keyer 58 will be disrupted causing the operational amplifiers 66 to produce an output to cause the multivibrator 64 to change in a direction to center the IF pulse received, but in so doing it must change its PRF of the transmit gate which as a result increases due to the fact that the pulsewidth must become smaller in order to maintain the position of the received IF pulse at the phase comparator 56. In this manner, the PRF becomes a function of the range separation between the two radars and can be measured at each radar which is necessary in a rendezvous radar system.

What has been shown and described therefore is an improved interrogator-transponder pulse radar system which is capable of operating as a rendezvous system for space application. Moreover, the subject invention is ideally suited for being fabricated completely of solid state components in substantially all of the electronic circuitry.

We claim as our invention:

1. A cooperative interrogator-transponder pulse radar system adapted to measure long ranges with a high degree of accuracy comprising in combination:

an interrogator radar and a transponder radar, both operable in both a CW and a pulse mode of operation including transmitter means for first transmitting CW signals of a first carrier frequency for initial lock up to a transponder radar and then transmitting radar pulses of said first carrier frequency and variable pulse repetition frequency (PRF) which is varied as a function of range separation between the interrogator and transponder and receiver means including circuit means for producing a predetermined IF frequency when receiving radar signals of a second carrier frequency transmitted from said transponder also generating first a CW and then a pulse signal of said second carrier frequency and having substantially the same variable PRF, said first and second carrier frequencies being separated by a predetermined frequency which is substantially equal to said IF frequency;

said transponder radar including receiver means responsive first to CW and then pulses of the said first carrier frequency transmitted from said interrogator radar, and transmitter means for first transmitting first CW signals of said second carrier frequency for initial lock up to said interrogator and then transmitting radar pulses of said second carrier frequency back to said interrogator, said first and second carrier frequency at the respective interrogator and transponder radars additionally acting as respective local oscillators for producing an IF signal of the same frequency in both radars;

a respective phase track loop included in both said interrogator and said transponder radars being responsive to CW signals and each having a variable frequency oscillator and a phase comparator circuit coupled together for phase locking the respective variable frequency oscillator to its IF frequency signal whereby said first and second carrier frequencies are locked together through the respective IF signal and said variable frequency oscillator operates at a predetermined substantially fixed frequency for the provision of a reference frequency signal; and a range track loop included in both said interrogator and said transponder radars, being responsive to the received radar IF pulse signals for controlling the respective PRFs of said radars after lock up in the CW mode of operation, each comprising PRF generator means coupled from said receiver means back to said transmitter means and being responsive to the pulse width of received IF pulse signals from the other radar to vary the PRF of the respective radar transmitter pulses and additionally generating a pair of adjacent range gates of predetermined variable equal pulse widths as a function of the range separation between said interrogator and said transponder radar, phase keyer circuit means coupled to said PRF generator means and said variable frequency oscillator in the respective phase track loop, being responsive to said pair of range gates to alternately invert the phase of said reference frequency signal applied thereto from said variable frequency oscillator, a second phase comparator circuit coupled to respective receiver means and said phase keyer circuit, being responsive to the respective IF pulse signals and the output of said phase keyer circuit and providing an output signal of a first polarity when said IF pulse signals and said reference frequency signal are in phase with one another and of the opposite polarity when said inputs are 180° out of phase, and integrator means coupled between said second phase comparator circuit and said PRF generator means, said integrator means averaging said output signals of said first and second opposite polarity and producing a control voltage to vary the frequency of said PRF generator means in a predetermined direction to produce the same PRF frequency and match the RF pulse widths in both the interrogator and transponder radars.

2. The invention as defined by claim 1 wherein said transmitter means of both said interrogator radar and said transponder radar additionally includes switch means coupled to said PRF generator means for producing respective radar pulses for transmission.

3. The invention as defined by claim 1 wherein said interrogator transmitter means includes a master oscillator of a predetermined frequency, frequency multiplier means coupled to said master oscillator means for generating said first carrier frequency and diode switch means coupled to said frequency multiplier means and said PRF generator means for generating radar pulses of said first carrier frequency for transmission to said transponder.

4. The system as defined by claim 3 wherein said frequency multiplier comprises a solid state varactor multiplier.

5. The invention as defined by claim 1 wherein said PRF generator means comprises a variable frequency multivibrator.

6. The invention as defined by claim 1 wherein said integrator means comprises an operational amplifier integrator.

7. The invention as defined by claim 1 wherein said range track loop additionally includes time delay means coupled between said PRF generator means and said transmitter means for delaying the transmission of the respective RF pulses for a selected time delay to provide ranging down to zero range separation between said interrogator and transponder.

8. The invention as defined by claim 1 and additionally including a threshold and verifier loop included in both said interrogator and transponder radars, said threshold and verifier loop comprising:
   a sweep circuit coupled to said variable frequency oscillator in said phase track loop for varying the frequency output of said variable frequency oscillator during acquisition; and
   a third phase comparator coupled to said variable frequency oscillator and said IF signal producing means for detecting phase coherency of said IF frequency and a frequency output from said variable frequency oscillator and providing an output indicative thereof; and
   threshold means coupled to said third phase detector and providing an output in response to phase coherency for deactivating said sweep circuit when a predetermined threshold is exceeded and, activating said transmitter means into said pulse mode of operation.

9. The invention as defined by claim 8 and additionally including a quadrature phase shift circuit coupled to said third phase comparator and said variable frequency oscillator.

10. The invention as defined by claim 1 wherein said respective range track loop additionally includes frequency discriminator means coupled to said integrator means for initially setting the PRF so that it corresponds to maximum range and becoming inoperative when phase lock occurs and the pulse mode of operation begins to permit said PRF generator means to vary in frequency as a function of range separation between said interrogator and transponder.

11. The invention as defined by claim 1 wherein said respective range track loop additionally includes limiter circuit means coupled between said phase keyer circuit and said second phase comparator circuit.

12. A cooperative pulse radar system comprising an interrogator unit and a transponder unit, one of which units is mounted on a vehicle to be carried relative to the other of said units between which range and relative velocity is to be measured, comprising:
   an interrogator radar unit including transmitter means for transmitting a first pulse modulated carrier of a first substantially fixed frequency and a receiver means for receiving a carrier of a second frequency;
   a transponder radar unit including receiver means for receiving said first pulse-modulated carrier and transmitter means for transmitting a second pulse-modulated carrier of a second frequency;
   means in each of said radars including a phase lock loop for maintaining lock-up between said first and second carriers by phase locking to the same predetermined IF signal frequency in both radar units to a reference frequency in said phase lock loop wherein the IF signal frequency in both radar units is substantially equal to the difference between said first and second carrier frequency and wherein the second carrier frequency is adapted to have a fixed relationship to the IF frequency in the transponder radar thereby maintaining a frequency offset between first and second carrier frequency equal to said IF signal frequency; and
   range gate means in each of said radars for automatically changing the PRFs of said pulse-modulated carriers as a function of the range separation between the interrogator and transponder radars so that range separation can be measured at either radar.

* * * * *